(12) United States Patent
Kuwana

(10) Patent No.: US 6,466,627 B1
(45) Date of Patent: Oct. 15, 2002

(54) PULSE SIGNAL TRANSMITTING CIRCUIT AND SUBSCRIBER'S LINE TERMINAL APPARATUS USING THE PULSE SIGNAL TRANSMITTING CIRCUIT

(75) Inventor: Isamu Kuwana, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/245,810

(22) Filed: Feb. 5, 1999

(30) Foreign Application Priority Data

May 19, 1998 (JP) ............................................. 10-137246

(51) Int. Cl.$^7$ ................................................. H04B 3/00
(52) U.S. Cl. ........................ 375/258; 375/288; 375/289; 375/291; 333/25; 307/7; 307/83; 307/87; 307/127; 307/129; 307/138; 363/89; 363/97
(58) Field of Search ................................. 375/258, 264, 375/278, 284, 286, 289, 288; 307/7, 87, 112, 127, 129, 138, 140, 83; 363/95, 97, 89; 333/25

(56) References Cited

U.S. PATENT DOCUMENTS

| | | | | |
|---|---|---|---|---|
| 3,875,332 A | * | 4/1975 | Fletcher et al. | 178/79 |
| 3,993,953 A | * | 11/1976 | Lender et al. | 341/57 |
| 4,121,118 A | * | 10/1978 | Miyazaki | 307/262 |
| 4,337,465 A | * | 6/1982 | Spracklen et al. | 178/2 R |
| 4,489,222 A | * | 12/1984 | Lusignan et al. | 330/10 |
| 4,922,249 A | * | 5/1990 | Cointot et al. | 341/57 |
| 5,109,391 A | * | 4/1992 | Kurobe | 327/108 |
| 5,475,285 A | * | 12/1995 | Konopka | 315/224 |
| 5,592,133 A | * | 1/1997 | Kawana | 333/25 |
| 5,793,262 A | * | 8/1998 | Kuwana | 333/25 |
| 5,881,012 A | * | 3/1999 | Kawasaki et al. | 365/226 |
| 5,933,340 A | * | 8/1999 | Adamson | 363/97 |
| 6,366,618 B1 | * | 4/2002 | Miller | 375/258 |

FOREIGN PATENT DOCUMENTS

| | | |
|---|---|---|
| JP | 8-116295 | 5/1996 |
| JP | 9-266583 | 10/1997 |

\* cited by examiner

*Primary Examiner*—Chi Pham
*Assistant Examiner*—Khanh cong Tran
(74) *Attorney, Agent, or Firm*—Katten Muchin Zavis Rosenman (57) ABSTRACT

A pulse signal transmitting circuit generates a pulse signal having an enhanced high-frequency component with a reduced power loss. A pulse signal is transmitted to a load circuit through a transmission cable connected to a secondary winding of a transformer. First and second transistors are connected to a primary winding of the transformer. A voltage output from an external power source is input to the primary winding of the transformer when at least one of the first and second transistors is conductive so that a pulse voltage signal is input to the transformer. A booster power supply circuit is located between the external power source and a middle point of the primary winding of the transformer. The booster power supply circuit superimposes a boost voltage onto the voltage input to the primary winding of the transformer so that a high-frequency component of the pulse voltage signal input to the primary winding of the transformer is enhanced.

19 Claims, 11 Drawing Sheets

| feet | SW1 | SW2 | SW3 | BOOST |
|---|---|---|---|---|
| 0~250 | ON | OFF | OFF | ◿ |
| 250~500 | OFF | ON | OFF | ◿ |
| 500~750 | OFF | OFF | ON | ◿ |

| feet | A | B | C | BOOST |
|---|---|---|---|---|
| | Q4 | Q5 | Q6 | |
| 0~250 | LOW ON | High OFF | High OFF |  |
| 250~500 | High OFF | LOW ON | High OFF |  |
| 500~750 | High OFF | High OFF | LOW ON |  |

FIG. 10

LC { W: WORKING CHANNEL PANEL(7)
     P: SPARE CHANNEL PANEL(1)

PULSE SIGNAL TRANSMITTING CIRCUIT AND SUBSCRIBER'S LINE TERMINAL APPARATUS USING THE PULSE SIGNAL TRANSMITTING CIRCUIT

BACKGROUND OF THE INVENTION

1. Field of the Invention

The present invention generally relates to a pulse signal transmitting circuit and, more particularly, to a pulse signal transmitting circuit used for a line build out (LBO) type balanced line drive circuit which generates a pulse voltage signal to be transmitted through a transmission cable. The LBO type balanced line drive circuit using the pulse signal transmitting circuit according to the present invention is suitable for a subscriber's line terminal apparatus.

2. Description of the Related Art

Figure 1:
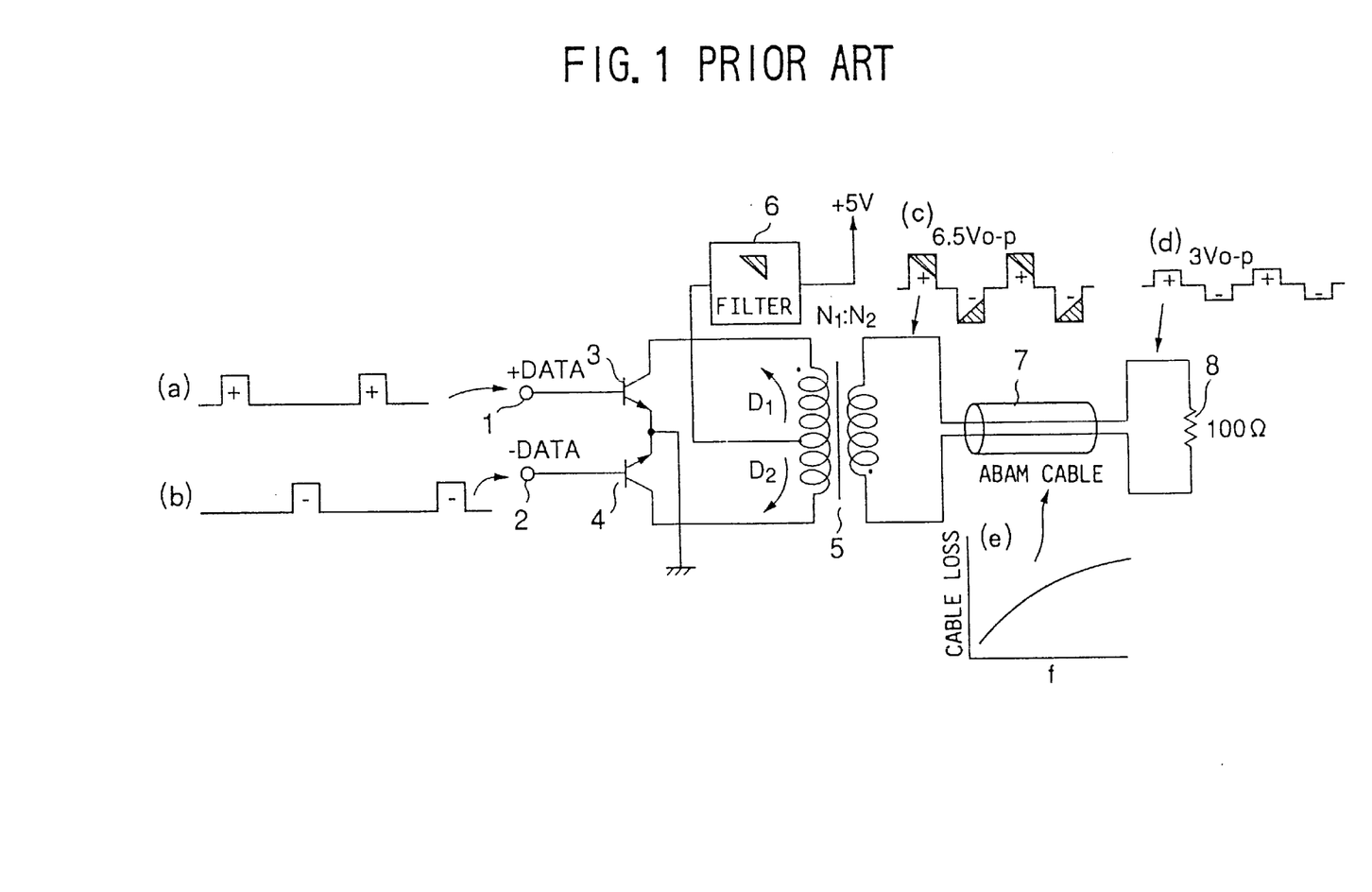
FIG. 1 is a circuit diagram of a conventional pulse signal transmitting circuit.

FIG. 1 is a circuit diagram of a conventional pulse signal transmitting circuit. The pulse signal transmitting circuit shown in FIG.1 comprises data input terminals 1 and 2, switching transistors 3 and 4, a transformer 5 (N1:N2=1:1.3) and a filter circuit 6. A secondary side of the transformer 5 is connected to an ABAM cable (shieldless pair line) 7 so as to transmit an output of the pulse signal transmitting circuit to a load circuit 8.

The switching transistors 3 and 4 are push-pull connected to each other, and are connected to the transformer 5 as a load circuit. A power source (+5V) is connected to a middle point of a primary winding of the transformer 5.

Figure 2:
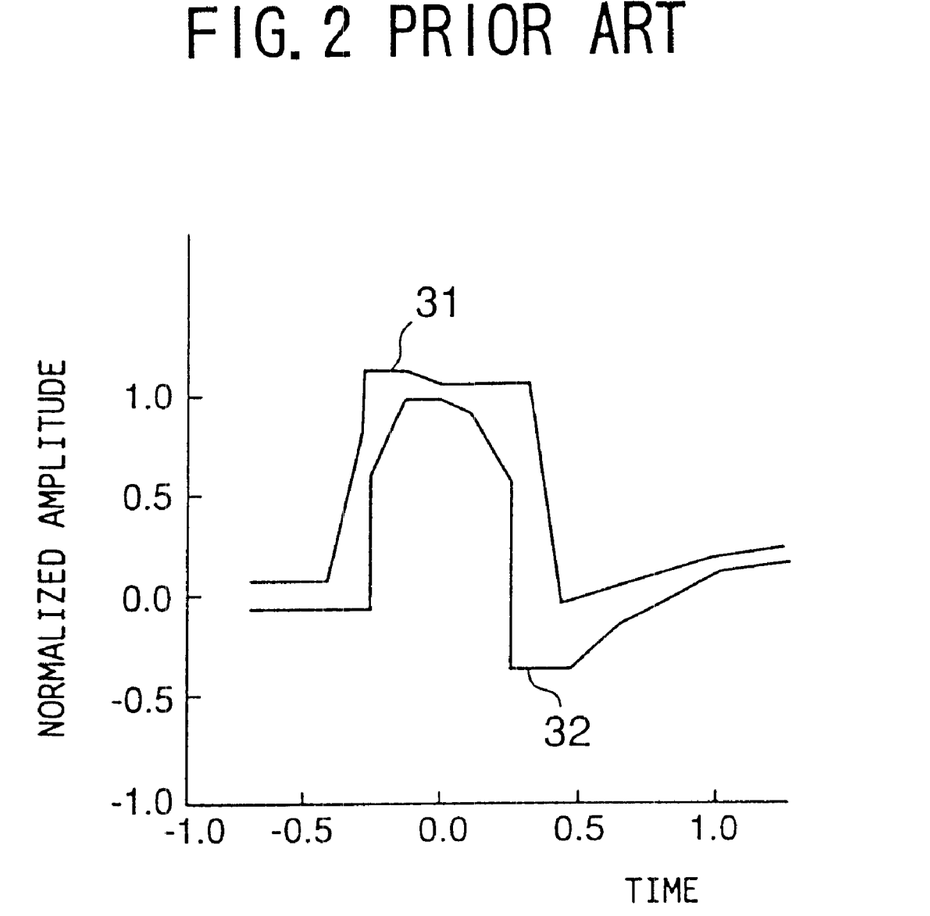
FIG. 2 is a graph showing a template of a pulse signal.

The ABAM cable 7 has a frequency characteristic as shown in a graph of FIG. 1-(e). That is, a cable loss increases as a frequency of the signal transmitted through the ABAM cable 7 increases. Such a frequency characteristic is compensated for by pre-distorting a pulse signal to be transmitted through the ABAM cable on the transmitter side. FIG. 2 shows an example of a pulse template recommended for a North America DS-1 apparatus specified by the Bell specification with respect to a transmission cable such as the ABAM cable 7. The pulse template shown in FIG. 2 is characterized in that an overshoot 31 and an undershoot 32 of a pulse signal are allowed. In order to conform to the specification, the pulse signal transmitting circuit shown in FIG. 1 is provided with the filter circuit 6. The filter circuit 6 is connected in series to the power source of the pulse signal transmitting circuit.

When a positive pulse signal (FIG. 1-(a)) is input to the data input terminal 1, the positive pulse signal is provided to a base of the transistor 3. Accordingly, the transistor 3 is turned on, and a current flows in a primary winding of the transformer 5 in a direction D1. At this time, the filter circuit 6 connected to the power source attenuates a low-frequency component of the positive pulse signal. As a result, a high-frequency component of the current flowing in the direction D1 is enhanced. Accordingly, a positive pulse signal is generated in a secondary winding of the transformer 5. Similarly, when a positive pulse signal (FIG. 1-(b)) is input to the data input terminal 2, the positive pulse signal is provided to a base of the transistor 4. Accordingly, the transistor 4 is turned on, and a current flows in the primary winding of the transformer 5 in a direction D2 which is opposite to the direction D1. Similar to the current flowing in the direction D1, a high-frequency component of the current flowing in the direction D2 is enhanced by the filter circuit 6, and a negative pulse signal is generated in the secondary winding of the transformer 5.

Accordingly, when the positive pulse signal (FIG. 1-(a)) is input to the data input terminal 1 and the positive pulse signal (FIG. 1-(b)) is input to the data input terminal 2, a bipolar pulse signal shown in FIG. 1-(c) is generated in the secondary winding of the transformer 5 which bipolar pulse signal has an enhanced high-frequency component. The bipolar pulse signal generated in the transformer 5 is transmitted to the load circuit 8 through the ABAM cable 7. While the pulse signal is transmitted through the ABAM cable 7, the high-frequency component of the pulse signal is attenuated and a pulse signal shown in FIG. 1-(d) is obtained at the load circuit 8.

As mentioned above, the conventional circuit is provided with the filter circuit 6 so as to obtain the pulse signal having an enhanced high-frequency component as shown in FIG. 1-(c). However, there is a problem in that a power loss occurs in the filter circuit 6 since the filter circuit 6 attenuates a low-frequency component of the current input to the transformer 5.

SUMMARY OF THE INVENTION

It is a general object of the present invention to provide an improved and useful pulse signal transmitting circuit in which the above-mentioned problem is eliminated.

A more specific object of the present invention is to provide a pulse signal transmitting circuit which can generate a pulse signal having an enhanced high-frequency component with a reduced power loss.

In order to achieve the above-mentioned object, there is provided according to the present invention a pulse signal transmitting circuit, comprising:

a transformer having a primary winding and a secondary winding, the secondary winding being connected to a transmission cable;

first and second switching elements connected to the primary winding of the transformer, a voltage output from an external power source being input to the primary winding of the transformer when at least one of the first and second switching elements is closed so that a pulse voltage signal is input to the transformer; and a booster power supply circuit provided between the external power source and a middle point of the primary winding of the transformer, the booster power supply circuit superimposing a boost voltage onto the voltage input to the primary winding of the transformer so that a high-frequency component of the pulse voltage signal input to the primary winding of the transformer is enhanced.

According to the above-mentioned invention, the booster power supply source generates a boost voltage and superimposes or adds the boost voltage to a voltage supplied from the power source. Accordingly, when one of the first and second switching elements is closed and the voltage of the power source is supplied to the transformer, the boost voltage is superimposed or added onto the voltage supplied to the transformer. Since the boost voltage is generated so as to enhance a high-frequency component of the pulse voltage signal to be input to the primary winding of the transformer, a pulse voltage signal generated in the secondary winding of the transformer also has an enhanced high-frequency component. Thus, the pulse signal transmitting circuit according to the present invention can generate a pulse voltage signal having an enhanced high-frequency component without causing power loss whereas the conventional apparatus generates a pulse voltage signal having an enhanced high-frequency component by cutting off a low-frequency component.

In the above-mentioned invention, the booster power supply circuit may store energy when the first and second switching elements are opened, the booster power supply circuit discharging the stored energy when at least one of the first and second switching elements is closed so as to enhance the high-frequency component of the pulse voltage signal supplied to the primary winding of the transformer.

According to this invention, the booster power supply circuit stores energy during a period in which the voltage of the power source is not supplied to either the first switching element or the second switching element. Thus, energy of the power source can be efficiently used.

In one embodiment of the present invention, the booster power supply circuit may comprise a coil having a predetermined inductance. The coil generates a reverse electromotive force when the pulse voltage signal is input to the transformer, and a voltage caused by the reverse electromotive force is superimposed onto the voltage supplied to the transformer.

Additionally, the pulse signal transmitting circuit according to the present invention may further comprise a third switching element connected in series with the coil so that an inverted signal of a sum of a first pulse signal supplied to the first switching element to close the first switching element and a second pulse signal supplied to the second switching element to close the second switching element is supplied to a control terminal of the third switching element, wherein the third switching element is closed when the first and second switching elements are open so that a current flows to the coil through the third switching element; and the third switching element is opened when at least one of the first and second switching elements is closed so that the current flowing to the coil is interrupted, and, thereby, a reverse electromotive force is generated by the coil and the voltage corresponding to the reverse electromotive force is superimposed on the voltage from the external power source.

According to this invention, the current to be supplied to the booster power supply circuit can be controlled by merely adding the third switching element and an inverter which inverts the sum of the first pulse signal and the second pulse signal. Thus, the booster power supply circuit can be achieved with a simple structure.

In one embodiment of the present invention, the booster power supply circuit may comprise a plurality of coils each of which has a predetermined inductance, and the pulse signal transmitting circuit may further comprise a booster selecting circuit which selects at least one of the plurality of coils according to a transmission characteristic and/or a length of the transmission cable.

Accordingly, an appropriate amount of boost can be obtained by selecting one or more coils from among the plurality of coils in accordance with a transmission characteristic and/or a length of the transmission cable to be used.

In one embodiment of the present invention, the booster selecting circuit may comprise a plurality of fourth switching elements each of which is connected in series with a respective one of the plurality of coils so that a selection of the coils is performed by operations of the switching elements.

Additionally, the pulse signal transmitting circuit according to this invention may further comprise a third switching element connected in series with each of the coils so that an inverted signal of a sum of a first pulse signal supplied to the first switching element to close the first switching element and a second signal supplied to the second switching element to close the second switching element is supplied to a control terminal of the third switching element, wherein the third switching element is closed when the first and second switching elements are opened so that a current flows to at least one of the coils through the third switching element; and the third switching element is opened when at least one of the first and second switching elements is closed so that the current flowing to at least one of the coils is interrupted, and, thereby, a reverse electromotive force is generated by the at least one of the coils and the voltage corresponding to the reverse electromotive force is superimposed on the voltage from the external power source.

According to this invention, the current supplied to the booster power supply circuit can be controlled by merely adding the third switching element and an inverter which inverts the sum of the first pulse signal and the second pulse signal. Thus, the booster power supply circuit can be achieved with a simple structure.

Additionally, in the pulse signal transmitting circuit according to the present invention, a first unipolar pulse signal may be supplied to a control terminal of the first switching element to close the first switching element, and a second unipolar pulse signal may be supplied to a control terminal of the switching element to close the second switching element so as to output a bipolar pulse signal from the secondary winding of the transformer.

In one embodiment of the present invention, the booster selecting circuit may comprise mechanical switches or electronic switches.

Additionally, there is provided according to another aspect of the present invention a subscriber's line terminal apparatus having the above-mentioned pulse signal transmitting circuit.

The subscriber's line terminal apparatus according to the present invention may have a plurality of channels, and the pulse signal transmitting circuit may be provided to each of the plurality of channels. In such a structure, the booster selecting circuit may be shared with a plurality of pulse signal transmitting circuits which results in a simple structure of the subscriber's line terminal apparatus.

Other objects, features and advantages of the present invention will become more apparent from the following detailed description when read in conjunction with the accompanying drawings.

DETAILED DESCRIPTION OF THE PREFERRED EMBODIMENTS

Figure 3:
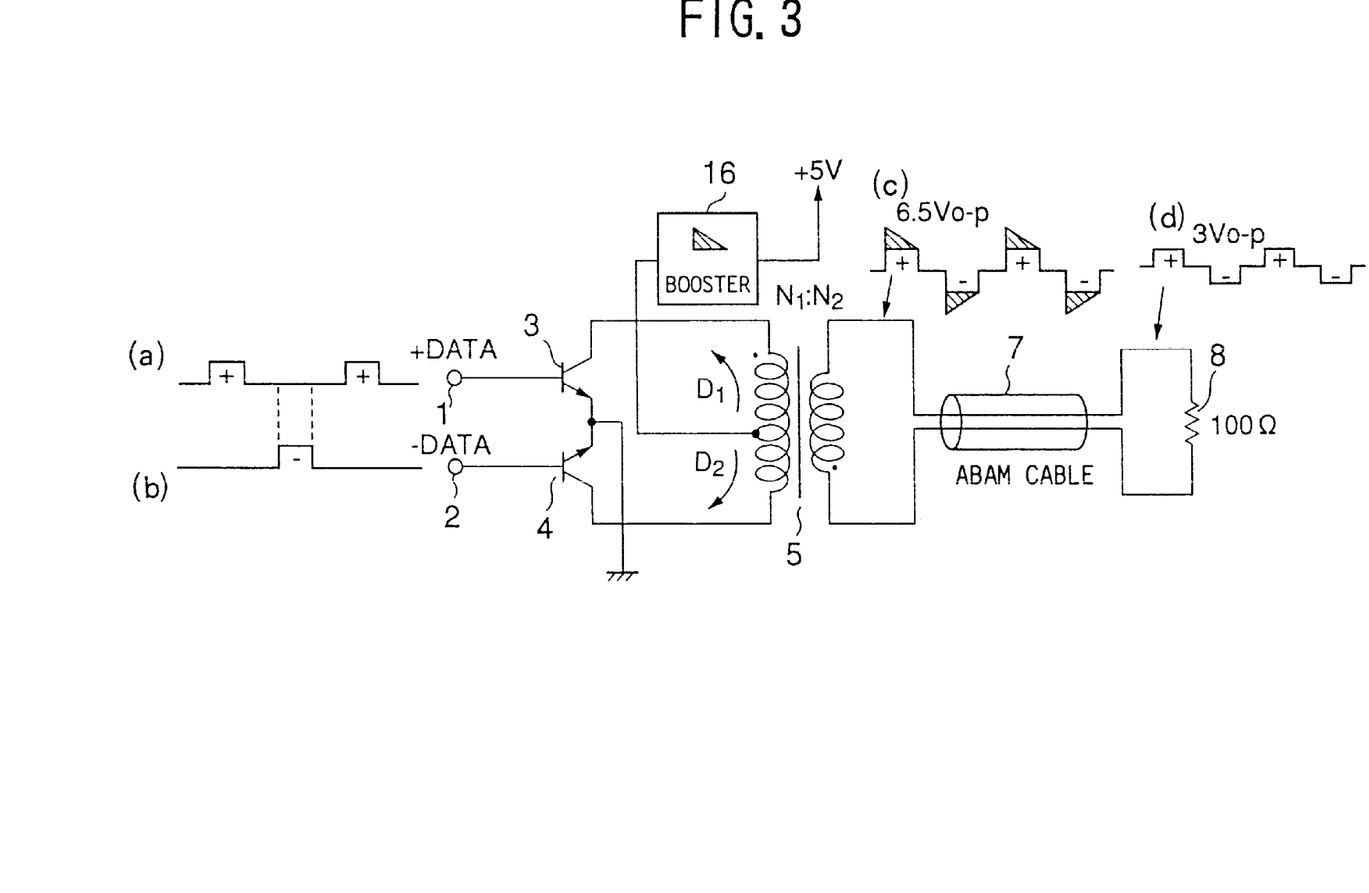
FIG. 3 is a circuit diagram of a pulse signal transmitting circuit according to the present invention.

A description will now be given of a principle of the present invention. FIG. 3 is a circuit diagram of a pulse signal transmitting circuit according to the present invention. In FIG. 3, parts that are the same as the parts shown in FIG. 1 are given the same reference numerals, and descriptions thereof will be omitted.

The pulse signal transmitting circuit shown in FIG. 3 has the same structure as the pulse signal transmitting circuit shown in FIG. 1 except for a booster power supply circuit 16 being provided instead of the filter circuit 6. That is, as shown in FIG. 3, the pulse signal transmitting circuit according to the present invention comprises the data input terminals 1 and 2, the switching transistors 3 and 4, the transformer 5 (N1:N2=1:1.3) and the booster power supply circuit 16. A voltage generated by the booster power supply circuit 16 is superimposed on a voltage supplied by the power source (+5V) so that a high-frequency component is added to pulse signals input to the transformer 5 via the switching transistors 3 and 4.

When a positive pulse signal (FIG. 3-($a$)) is input to the data input terminal 1, the positive pulse signal is provided to a base of the transistor 3. Accordingly, the transistor 3 is turned on, and a current flows in the primary winding of the transformer 5 in a direction D1. At this time, the booster power supply circuit 16 connected to the power source (+5V) adds a high-frequency component to the positive pulse signal. Accordingly, a positive pulse signal having an enhanced high-frequency component is generated in the secondary winding of the transformer 5. Similarly, when a positive pulse signal (FIG. 3-($b$)) is input to the data input terminal 2, the positive pulse signal is provided to a base of the transistor 4. Accordingly, the transistor 4 is turned on, and a current flows in the primary winding of the transformer 5 in a direction D2 which is opposite to the direction D1. Similar to the current flowing in the direction D1, a high-frequency component of the current flowing in the direction D2 is enhanced by the booster power supply source circuit 16, and a negative pulse signal having an enhanced high-frequency component is generated by the secondary winding of the transformer 5.

Accordingly, when the positive pulse signal (FIG. 3-($a$)) is input to the data input terminal 1 and the positive pulse signal (FIG. 3-($b$)) is input to the data input terminal 2, a bipolar pulse signal shown in FIG. 3-($c$) is generated in the secondary winding of the transformer 5 which bipolar pulse signal has an enhanced high-frequency component. The bipolar pulse signal generated by the transformer 5 is transmitted to the load circuit 8 through the ABAM cable 7. While the pulse signal is transmitted through the ABAM cable 7, the high-frequency component of the pulse signal is attenuated and a pulse signal shown in FIG. 3-($d$) is obtained at the load circuit 8.

Accordingly, similar to the conventional pulse signal generating circuit, the pulse signal transmitting circuit according to the present invention generates a pulse signal having a waveform satisfying the template shown in FIG. 2. However, the pulse signal transmitting circuit according to the present invention differs from the conventional pulse signal transmitting circuit in that the conventional pulse signal generating circuit attenuates a low-frequency component of a pulse signal by the filter circuit whereas the pulse signal transmitting circuit according to the present invention superimposes a high-frequency component on the pulse signal by the booster power supply source 16.

Figure 4:
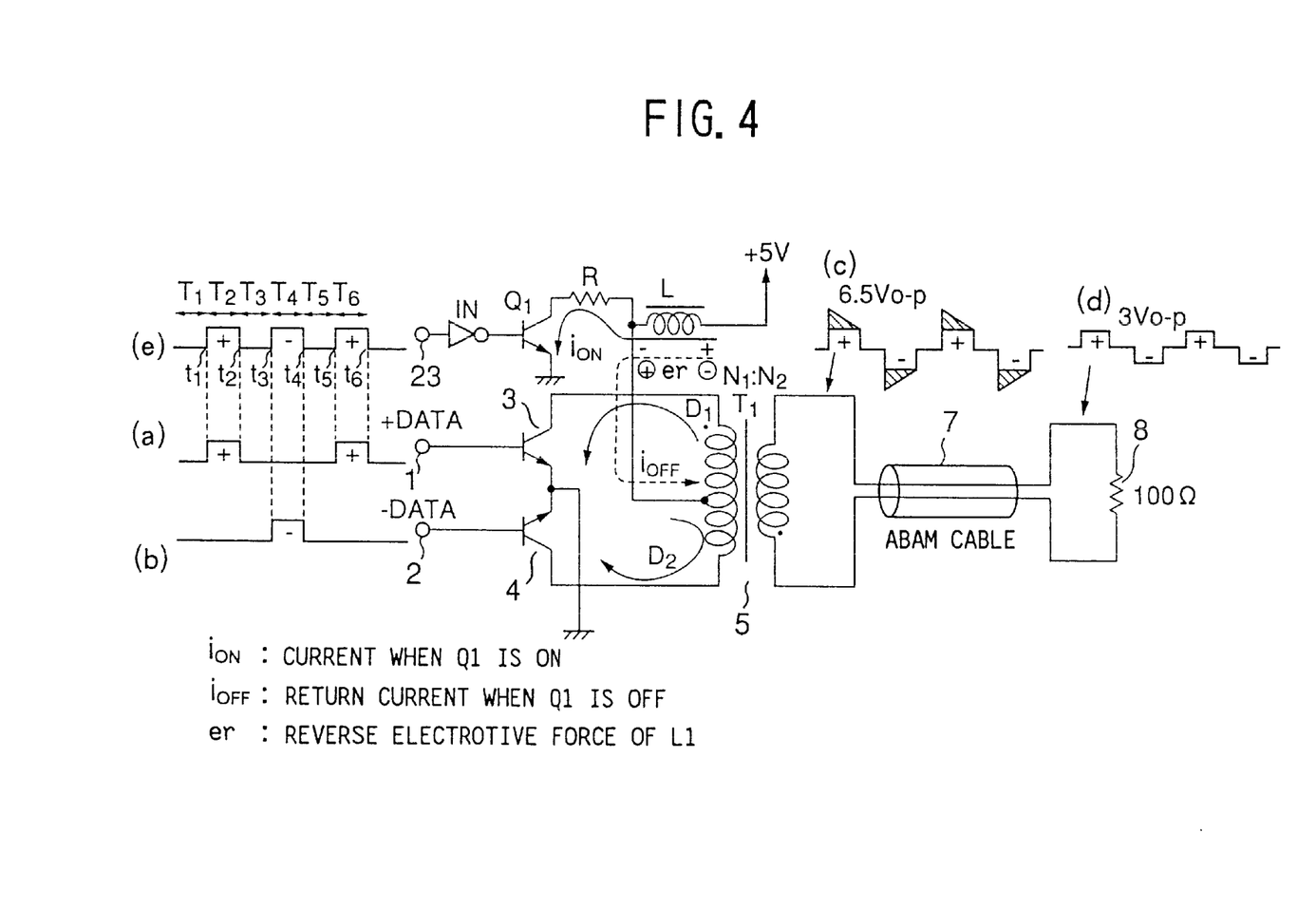
FIG. 4 is a circuit diagram of a pulse signal transmitting circuit according to a first embodiment of the present invention.

A description will now be given, with reference to FIG. 4, of a first embodiment of the present invention. FIG. 4 is a circuit diagram of a pulse signal transmitting circuit according to the first embodiment of the present invention. In FIG. 4, parts that are the same as the parts shown in FIG. 3 are given the same reference numerals, and descriptions thereof will be omitted.

In the pulse signal transmitting circuit shown in FIG. 4, a positive pulse signal (FIG. 4-($a$)) is input to the data input terminal 1 and a positive pulse signal (FIG. 4-($b$)) is input to the data input terminal 2. A bipolar pulse signal shown in FIG. 4-($c$) is generated in the secondary winding of the transformer 5 which bipolar pulse signal has an enhanced high-frequency component. The bipolar pulse signal generated by the transformer 5 is transmitted to the load circuit 8 through the ABAM cable 7. While the pulse signal is transmitted through the ABAM cable 7, the high-frequency component of the pulse signal is attenuated and a pulse signal shown in FIG. 4-($d$) is obtained at the load circuit 8.

In the pulse signal transmitting circuit shown in FIG. 4, the booster power supply circuit comprises an inverter IN, a transistor Q1, a resistor R and a coil L1. When pulse signals (FIG. 4-($a$) and FIG. 4-($b$)) are input to the data input terminals 1 and 2, respectively, a pulse signal (FIG. 4-($e$)) which is a sum of the pulse signal (FIG. 4-($a$)) and the pulse signal (FIG. 4-($b$)) is input to an input terminal 23 of the inverter IN. When both the pulse signals FIG. 4-($a$) and FIG. 4-($b$) are at a low level during a period T1, the transistor Q1 is turned on, and a current ion flows through the coil L1 and the resistor R. The current ion continue to flow until a time t1 is reached. During the period T1, both the switching transistors 3 and 4 are turned off. When the time t1 is reached, the positive pulse signal FIG. 4-($a$) is input to the switching transistor 3, and, thereby, a current ioff starts to flow in the primary winding of the transformer 5 in a direction D1. At this time, the transistor Q1 is turned off. As a result, a reverse electromotive force er is generated in the coil L1. The reverse electromotive force er is proportional to the current ion and an inductance of the coil L1. The reverse electromotive force er is superimposed on the voltage (+5V) of the power source. The reverse electromotive force er of the coil L1 has a large initial value followed by exponentially attenuated values. Accordingly, a pulse signal generated in the secondary winding of the transformer 5 has a component corresponding to the electromotive force er as shown in FIG. 4-($c$). When a time t2 is reached, the input terminal 23 of the inverter IN is changed to a low level, and the transistor Q1 is turned on during a period T3. Thus, the current ion flows again through the resistor R and the coil L1 during the period T3. When a time t3 is reached, the positive pulse signal FIG. 4-($b$) is provided to the base of the switching transistor 4, and a current flows in the primary winding of the transformed 5 in the direction D2. At this time, the transistor Q1 is turned off, and the reverse electromotive force er is generated in the coil L1. The reverse electromotive force er is superimposed on the voltage (+5V) of the power source. Accordingly, a negative pulse signal having a part corresponding to the reverse electromotive force er is output from the secondary winding of the transformer 5. As a result, a pulse signal which is unipolar-to-bipolar converted and has an enhanced high-frequency component is output from the secondary winding of the transformer 5.

Figure 5:
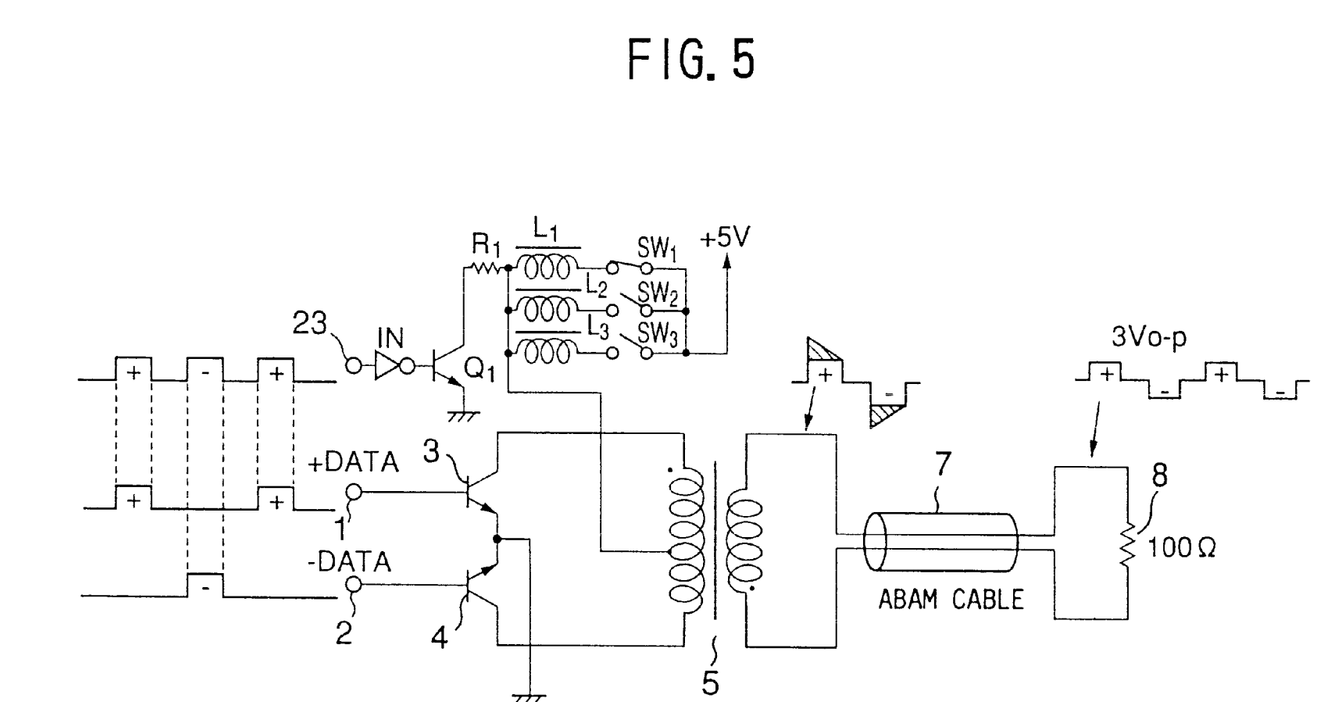
FIG. 5 is a circuit diagram of a pulse signal transmitting circuit according to a second embodiment of the present invention.

FIG. 5 is a circuit diagram of a pulse signal transmitting circuit according to a second embodiment of the present invention. In FIG. 5, parts that are the same as the parts shown in FIG. 3 are given the same reference numerals, and descriptions thereof will be omitted.

The pulse signal transmitting circuit according to the second embodiment differs from the pulse signal transmitting circuit according to the first embodiment in that the pulse signal transmitting circuit according to the second embodiment is provided with a plurality of coils L1, L2 and L3 and a plurality of switches SW1, SW2 and SW3. The switches SW1, SW2 and SW3 are connected in series with the respective coils L1, L2 and L3. Similar to the coil L shown in FIG. 4, each of the coils L1, L2 and L3 generates a reverse electromotive force. Inductance of the coils L1, L2 and L3 are different from each other so that one of the coils L1, L2 and L3 is selected according to a transmission characteristic or a length of the ABAM cable 7. The selection of one of the coils L1, L2 and L3 is performed by the switches SW1, SW2 and SW3.

Figure 6:
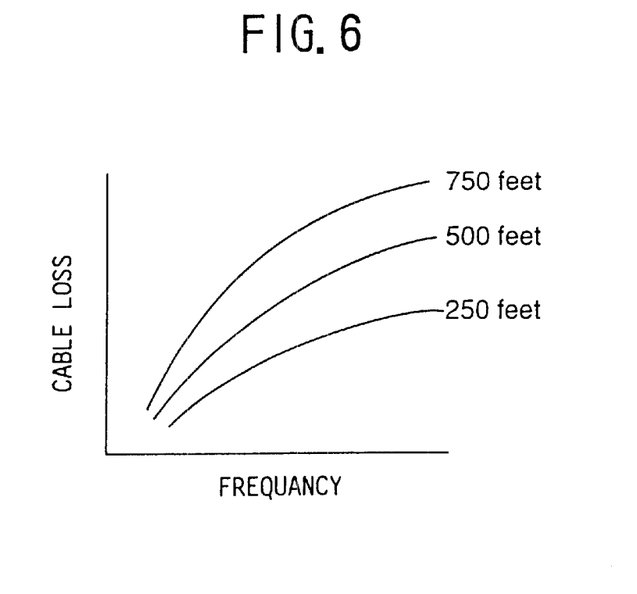
FIG. 6 is a graph showing a relationship between a frequency and a cable loss of a cable for various lengths of the cable.

FIG. 6 is a graph showing a relationship between a frequency and a cable loss of the ABAM cable 7 for various lengths of the ABAM cable 7. It can be interpreted from the graph of FIG. 6 that a cable loss is increased as a length of the ABAM cable 7 is increased. Accordingly, an amount of compensation must be increased as a length of the ABAM cable 7 is increased.

Figure 7:
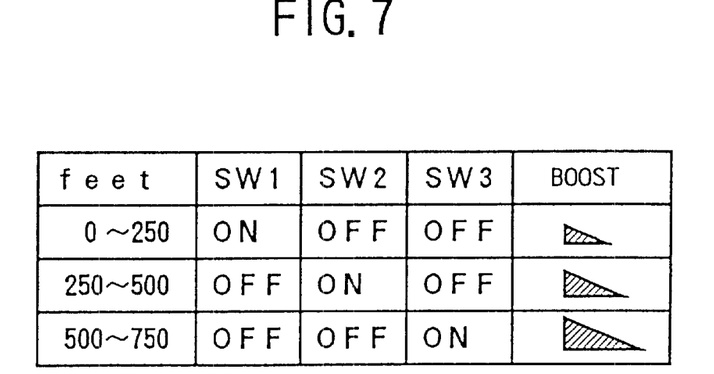
FIG. 7 is an illustration for explaining combinations of operations of switches shown in FIG. 5 and an amount of boosted voltage by coils shown in FIG. 5.

FIG. 7 is an illustration for explaining combinations of operations of the switches SW1, SW2 and SW3 and an amount of boosted voltage by the coils L1, L2 and L3. It is assumed that a length of each of the coils L1, L2 and L3 satisfies a relationship L1<L2<L3. As shown in FIG. 7, when the length of the ABAM cable 7 is short (0–250 feet), the switch SW1 is turned on and the switches SW2 and SW3 are turned off so as to select the coil L1 which generates a small reverse electromotive force. When the length of the ABAM cable 7 is medium (250–500 feet), the switch SW2 is turned on and the switches SW1 and SW3 are turned off so as to select the coil L2 which generates a medium reverse electromotive force. When the length of the ABAM cable 7 is long (500–750 feet), the switch SW3 is turned on and the switches SW1 and SW2 are turned off so as to select the coil L3 which generates a large reverse electromotive force.

It should be noted that a plurality of identical coils may be provided in parallel or in series so as to select one or a plurality of coils according to the length of the ABAM cable 7.

Figure 8:
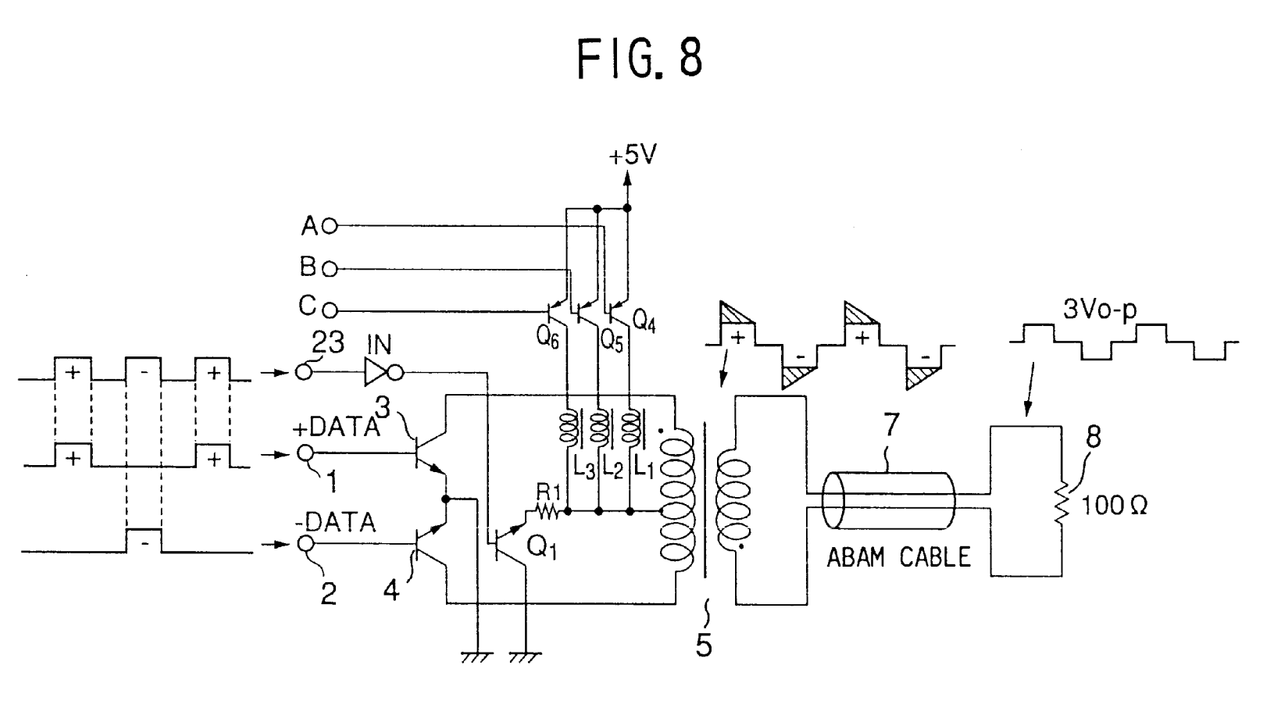
FIG. 8 is a circuit diagram of a pulse signal transmitting circuit according to a third embodiment of the present invention.

FIG. 8 is a circuit diagram of a pulse signal transmitting circuit according to a third embodiment of the present invention. In FIG. 8, parts that are the same as the parts shown in FIG. 5 are given the same reference numerals, and descriptions thereof will be omitted.

As shown in FIG. 8, the pulse signal transmitting circuit according to the third embodiment is provided with transistors Q4, Q5 and Q6 instead of the switches SW1, SW2 and SW3 provided in the pulse signal transmitting circuit according to the second embodiment. That is, in the pulse signal transmitting circuit according to the third embodiment, the selection of one of the coils L1, L2 and L3 is performed by using the transistors Q4, Q5 and Q6.

Figure 9:
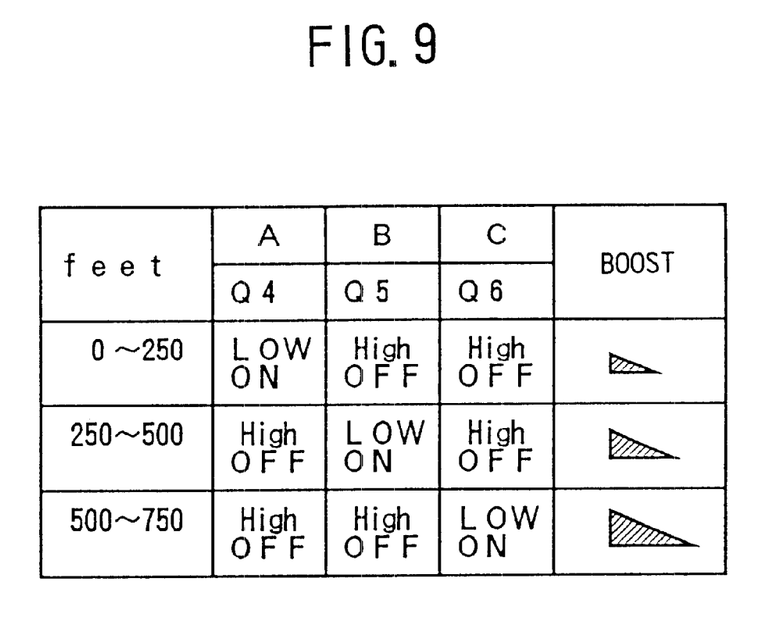
FIG. 9 is an illustration for explaining combinations of operations of transistors shown in FIG. 8 and an amount of boosted voltage by coils shown in FIG. 8.

FIG. 9 is an illustration for explaining combinations of operations of the transistors Q4, Q5 and Q6 and an amount of boosted voltage by the coils L1, L2 and L3. It is assumed that a length of each of the coils L1, L2 and L3 satisfies a relationship L1<L2<L3. As shown in FIG. 9, when the length of he ABAM cable 7 is short (0–250 feet), a low-level signal is input only to an input terminal A of the transistor Q4 so as to select the coil L1 which generates a small reverse electromotive force. When the length of the ABAM cable 7 is medium (250–500 feet), a low-level signal is input only to an input terminal B of the transistor Q5 so as to select the coil L2 which generates a medium reverse electromotive force. When the length of the ABAM cable 7 is long (500–750 feet), a low-level signal is input only to an input terminal C of the transistor Q6 so as to select the coil L3 which generates a large reverse electromotive force.

It should be noted that a plurality of identical coils may be provided in parallel or in series so as to select one or a plurality of coils according to the length of the ABAM cable 7.

Figure 10:
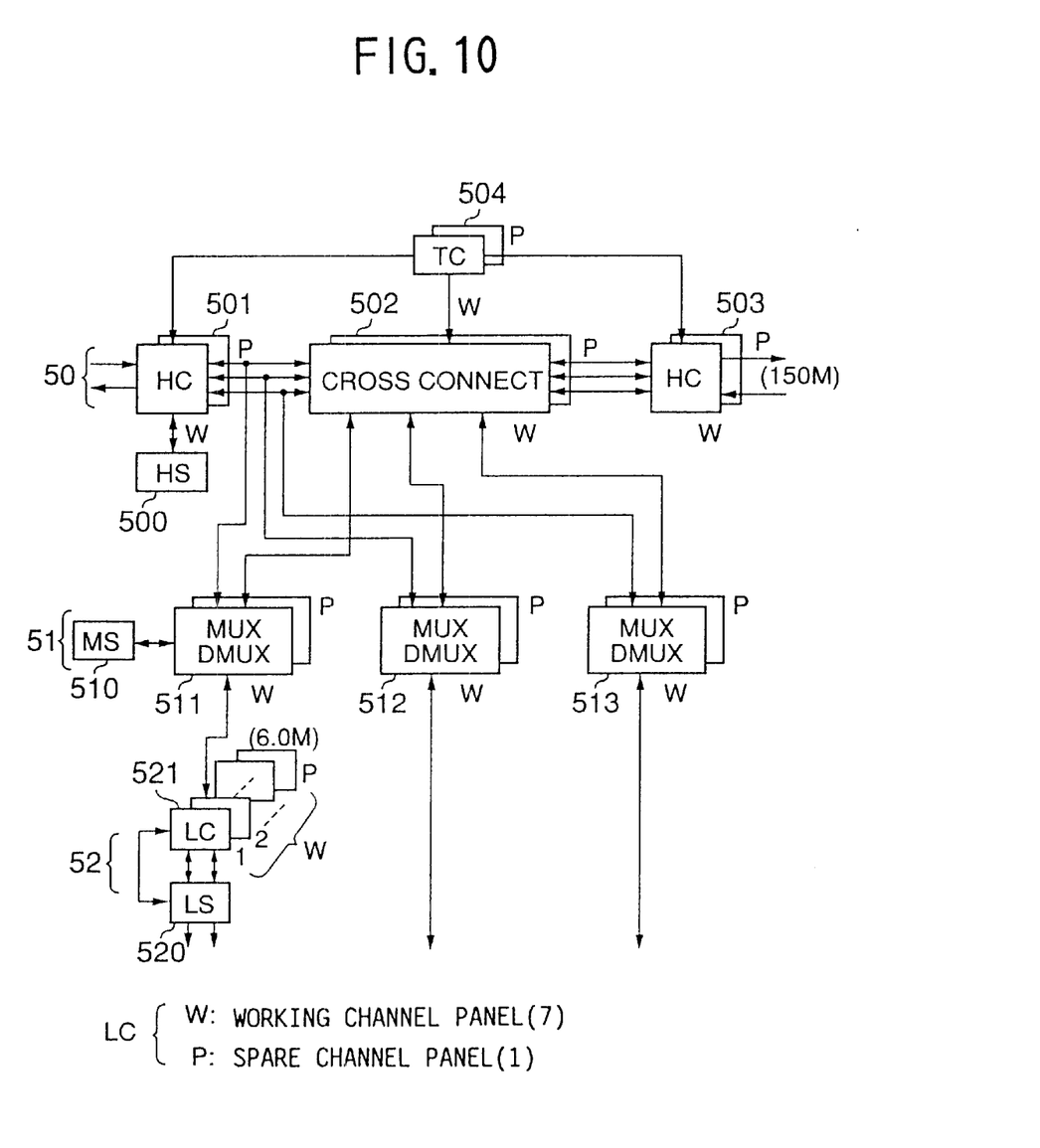
FIG. 10 is a block diagram of a subscriber's line terminal apparatus of an optical multiplex transmission system to which the present invention is applicable.

A description will now be given of a subscriber's line terminal apparatus of an optical multiplex transmission system to which the above-mentioned pulse signal transmitting circuits are applicable. FIG. 10 is a block diagram of a subscriber's line terminal apparatus of an optical multiplex transmission system.

In FIG. 10, interface devices 501 and 503 interface a cross-connect device 502 with a transmission line 50 which transmits an optical multiplex signal of 150 MHz. The cross-connect device 502 is provided between the interface devices 501 and 503. A clock signal is supplied to each of the cross-connect device 502 and interface devices 501 and 503 from a clock supply device 504. Each of the interface devices 501 and 503, the cross-connect device 502 and the clock supply device 504 has a duplex structure having a working device W and a spare device P. Switching between the working device P and the spare device W is controlled by a switch control unit 500. The cross-connect device 502 performs time base switching at a bit rate of 50 MHz. Each of the interface devices 501 and 503 multiplexes signals output from the cross connect device 502 so as the convert the signals into a signal of 150 MHz, and demultiplexes signals of 150 MHz to signals of 50 MHz.

Additionally, the subscriber's line terminal apparatus shown in FIG. 10 further comprises a middle-level group device 51 which includes multiplexer/demultiplexer devices 511, 512 and 513. Each of the multiplexer/demultiplexer devices 511, 512 and 513 supplies a signal of 50 MHz to the cross connect device 502. Additionally, each of the multiplexer/demultiplexer devices 511, 512 and 513 receives a signal of 50 MHz and converts the received signal into a signal of 6 MHz for a low-level group device. Similar to the high-level group device, each of the multiplexer/demultiplexer devices 511, 512 and 513 has a duplex structure having a working device W and a spare device P. Switching between the working device W and the spare device P is controlled by a switch control unit 510.

Further, the subscriber's line terminal apparatus shown in FIG. 10 comprises a low-level group device 52. The low-level group device 52 receives a signal of 6 MHz, and converts the received signal into a signal of 1.5 MHz which is transmitted between a terminal apparatus (not shown in the figure). The low-level group device 52 includes a low-level group channel panel 521 which converts the signal of 6 MHz into the signal of 1.5 MHz. The low-level group channel panel 521 has a N versus 1 structure which includes a plurality of working channel panels W and a single spare channel panel P. Switching between one of the working channel panels W and the spare channel panel P is controlled by a switch control unit 520.

The LBO type line drive circuit according to the present invention is used for the low-level channel panel. Specifically, the low-level group channel panel comprises a total of eight (8) channel panels including seven (7) working panels and one (1) spare panel. Each of the eight channel panels includes circuits corresponding to four (4) channels. The LBO type line drive circuit according to the present invention is provided to each channel.

Figure 11:
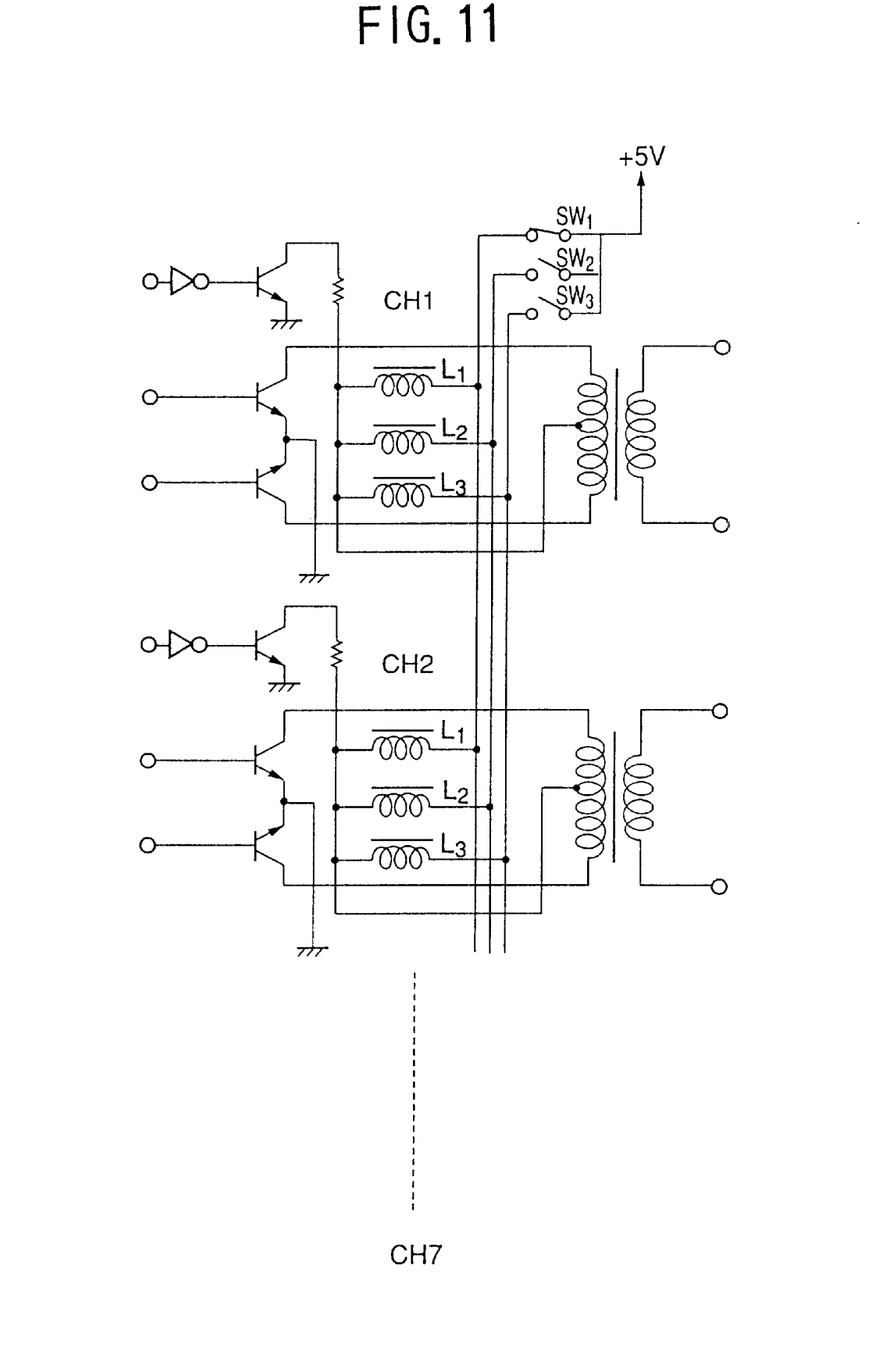
FIG. 11 is a circuit diagram of a part of a first example of a subscriber's line terminal apparatus to which the pulse signal transmitting circuit according to the present invention is applied according to a multi-channel structure.

FIG. 11 is a circuit diagram of a part of a first example of a subscriber's line terminal apparatus to which the pulse signal transmitting circuit according to the present invention is applied according to a multi-channel structure. The subscriber's line terminal apparatus shown in FIG. 11 has seven channels. Accordingly, seven pulse signal transmitting circuits are provided in the circuit shown in FIG. 11 (only two of them are shown). It can be appreciated that the structure of each of the pulse signal transmitting circuits corresponds to the pulse signal transmitting circuit according to the second embodiment of the present invention.

Each of the pulse signal transmitting circuits shown in FIG. 11 is connected to a respective terminal (not shown in the figure) via a transmission line such as the ABAM cable 7, and lengths of the transmission lines are equal to each other. Accordingly, an amount of voltage to be boosted can be equalized for each of the pulse signal transmitting circuits. Thus, identical coils L1, L2 and L3 are used in each of the pulse signal transmitting circuits, and the switches SW1, SW2 and SW3 are commonly used for the pulse signal transmitting circuits corresponding to seven channels.

Figure 12:
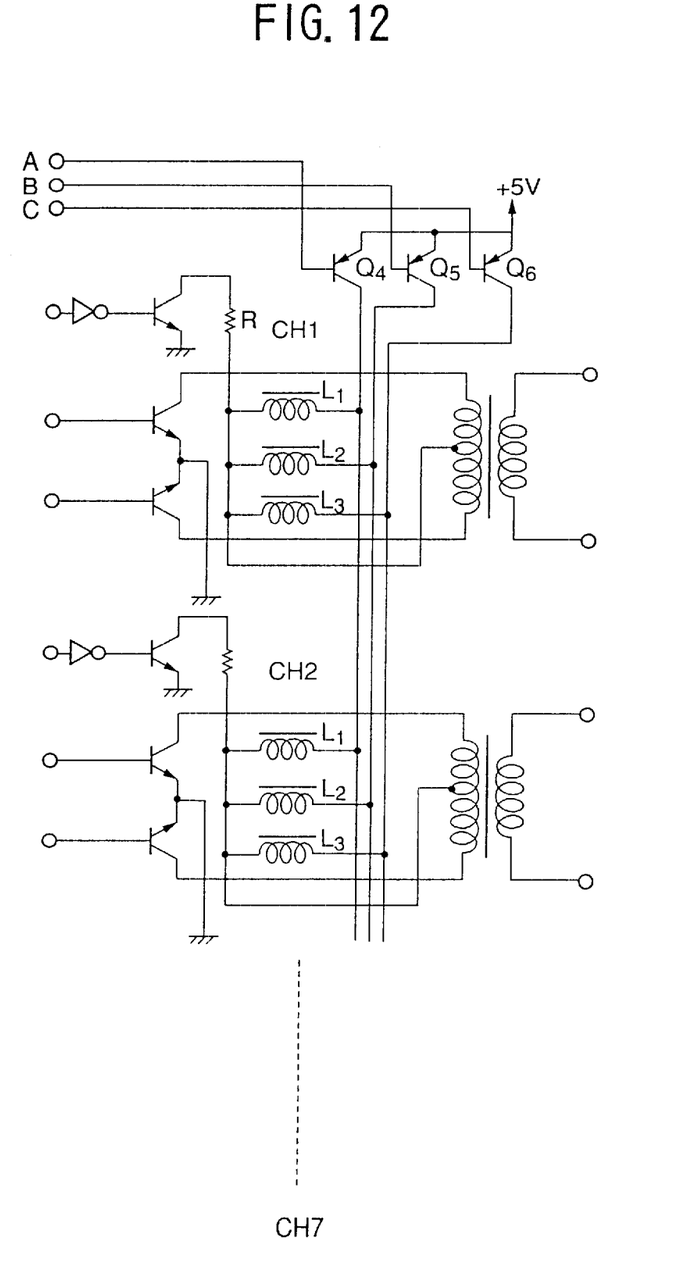
FIG. 12 is a circuit diagram of a part of a second example of the subscriber's line terminal apparatus to which the pulse signal transmitting circuit according to the present invention is applied according to a multi-channel structure.

FIG. 12 is a circuit diagram of a part of a second example of the subscriber's line terminal apparatus to which the pulse signal transmitting circuit according to the present invention is applied according to a multi-channel structure. The subscriber's line terminal apparatus shown in FIG. 12 has seven channels. Accordingly, seven pulse signal transmitting circuits are provided in the circuit shown in FIG. 12 (only two of them are shown). It can be appreciated that the structure of each of the pulse signal transmitting circuits corresponds to the pulse signal transmitting circuit according to the third embodiment of the present invention.

Each of the pulse signal transmitting circuits shown in FIG. 12 is connected to a respective terminal (not shown in the figure) via a transmission line such as the ABAM cable 7, and lengths of the transmission lines are equal to each other. Accordingly, an amount of voltage to be boosted can be equalized for each of the pulse signal transmitting circuits. Thus, identical coils L1, L2 and L3 are used in each of the pulse signal transmitting circuits, and the transistors Q4, Q5 and Q6 are commonly used for the pulse signal transmitting circuits corresponding to seven channels.

The present invention is not limited to the specifically disclosed embodiments, and variations and modifications may be made without departing from the scope of the present invention.

The present application is based on Japanese priority application No.10-137246 filed on May 19, 1998, the entire contents of which are hereby incorporated by reference.

What is claimed is:

1. A pulse signal transmitting circuit, comprising:

a transformer having a primary winding and a secondary winding, said secondary winding being connected to a transmission cable;

first and second switching elements connected to said primary winding of said transformer, a voltage output from an external power source being input to said primary winding of said transformer when at least one of said first and second switching elements is closed so that a pulse voltage signal is input to said transformer; and a booster power supply circuit provided between said external power source and a middle point of said primary winding of said transformer, said booster power supply circuit superimposing a boost voltage onto the voltage input to said primary winding of said transformer so that a high-frequency component of the pulse voltage signal input to said primary winding of said transformer is enhanced.

2. The pulse signal transmitting circuit as claimed in claim 1, wherein said booster power supply circuit stores energy when said first and second switching elements are open, said booster power supply circuit discharging the stored energy when at least one of said first and second switching elements is closed so as to enhance the high-frequency component of the pulse voltage signal supplied to said primary winding of said transformer.

3. The pulse signal transmitting circuit as claimed in claim 1, wherein said booster power supply circuit comprises a coil having a predetermined inductance.

4. The pulse signal transmitting circuit as claimed in claim 3, further comprising a third switching element connected in series with said coil so that an inverted signal of a sum of a first pulse signal supplied to said first switching element to close said first switching element and a second pulse signal supplied to said second switching element to close said second switching element is supplied to a control terminal of said third switching element, wherein said third switching element is closed when said first and second switching elements are open so that a current flows to said coil through said third switching element; and said third switching element is opened when at least one of said first and second switching elements is closed so that the current flowing to said coil is interrupted, and, thereby, a reverse electromotive force is generated by said coil and the voltage corresponding to the reverse electromotive force is superimposed onto the voltage from said external power source.

5. The pulse signal transmitting circuit as claimed in claim 1, wherein said booster power supply circuit comprises a plurality of coils each of which has a predetermined inductance, and said pulse signal transmitting circuit further comprises a booster selecting circuit which selects at least one of said plurality of coils according to a transmission characteristic and/or a length of said transmission cable.

6. The pulse signal transmitting circuit as claimed in claim 5, wherein said booster selecting circuit comprises a plurality of fourth switching elements each of which is connected in series with a respective one of said plurality of coils so that selection of said coils is performed by operations of said fourth switching elements.

7. The pulse signal transmitting circuit as claimed in claim 5, further comprising a third switching element connected in series with each of said coils so that an inverted signal of a sum of a first pulse signal supplied to said first switching element to close said first switching element and a second signal supplied to said second switching element to close said second switching element is supplied to a control terminal of said third switching element, wherein said third switching element is closed when said first and second switching elements are open so that a current flows to at least one of said coils through said third switching element; and said third switching element is opened when at least one of said first and second switching elements is closed so that the current flowing to at least one of said coils is interrupted, and, thereby, a reverse electromotive force is generated by said at least one of said coils and the voltage corresponding to the reverse electromotive force is superimposed onto the voltage from said external power source.

8. The pulse signal transmitting circuit as claimed in claim 1, wherein a first unipolar pulse signal is supplied to a control terminal of said first switching element to close said first switching element, and a second unipolar pulse signal is supplied to a control terminal of said switching element to close said second switching element so as to output a bipolar pulse signal from said secondary winding of said transformer.

9. The pulse signal transmitting circuit as claimed in claim 5, wherein said booster selecting circuit comprises mechanical switches.

10. The pulse signal transmitting circuit as claimed in claim 5, wherein said booster selecting circuit comprises electronic switches.

11. A subscriber's line terminal apparatus having a pulse signal transmitting circuit, said pulse signal transmitting circuit comprising:

a transformer having a primary winding and a secondary winding, said secondary winding being connected to a transmission cable;

first and second switching elements connected to said primary winding of said transformer, a voltage output from an external power source being input to said primary winding of said transformer when at least one of said first and second switching elements is closed so that a pulse voltage signal is input to said transformer; and a booster power supply circuit provided between said external power source and a middle point of said primary winding of said transformer, said booster power supply circuit superimposing a boost voltage onto the voltage input to said primary winding of said transformer so that a high-frequency component of the pulse voltage signal input to said primary winding of said transformer is enhanced.

12. The subscriber's line terminal apparatus as claimed in claim 11, wherein said booster power supply circuit stores energy when said first and second switching elements are open, said booster power supply circuit discharging the stored energy when at least one of said first and second switching elements is closed so as to enhance the high-frequency component of the pulse voltage signal supplied to said primary winding of said transformer.

13. The subscriber's line terminal apparatus as claimed in claim 11, wherein said booster power supply circuit comprises a coil having a predetermined inductance.

14. The subscriber's line terminal apparatus as claimed in claim 13, further comprising a third switching element connected in series with said coil so that an inverted signal of a sum of a first pulse signal supplied to said first switching element to close said first switching element and a second pulse signal supplied to said second switching element to close said second switching element is supplied to a control terminal of said third switching element, wherein said third switching element is closed when said first and second switching elements are open so that a current flows to said coil through said third switching element; and said third switching element is opened when at least one of said first and second switching elements is closed so that the current flowing to said coil is interrupted, and, thereby, a reverse electromotive force is generated by said coil and the voltage corresponding to the reverse electromotive force is superimposed onto the voltage from said external power source.

15. The subscriber's line terminal apparatus as claimed in claim 11, wherein said booster power supply circuit comprises a plurality of coils each of which has a predetermined inductance, and said pulse signal transmitting circuit further comprises a booster selecting circuit which selects at least one of said plurality of coils according to a transmission characteristic and/or a length of said transmission cable.

16. The subscriber's line terminal apparatus as claimed in claim 15, wherein said booster selecting circuit comprises a plurality of fourth switching elements each of which is connected in series with a respective one of said plurality of coils so that a selection of said coils is performed by operations of said fourth switching elements.

17. The subscriber's line terminal apparatus as claimed in claim 15, further comprising a third switching element connected in series with each of said coils so that an inverted signal of a sum of a first pulse signal supplied to said first switching element to close said first switching element and a second signal supplied to said second switching element to close said second switching element is supplied to a control terminal of said third switching element, wherein said third switching element is closed when said first and second switching elements are open so that a current flows to at least one of said coils through said third switching element; and said third switching element is opened when at least one of said first and second switching elements is closed so that the current flowing to at least one of said coils is interrupted, and, thereby, a reverse electromotive force is generated by said at least one of said coils and the voltage corresponding to the reverse electromotive force is superimposed onto the voltage from said external power source.

18. The subscriber's line terminal apparatus as claimed in claim 11, wherein a first unipolar pulse signal is supplied to a control terminal of said first switching element to close said first switching element, and a second unipolar pulse signal is supplied to a control terminal of said switching element to close said second switching element so as to output a bipolar pulse signal from said secondary winding of said transformer.

19. The subscriber's line terminal apparatus as claimed in claim 11, wherein the pulse signal transmitting circuit is provided to each of a plurality of channels, and said booster selecting circuit is shared by a plurality of pulse signal transmitting circuits.

* * * * *